United States Patent [19]

Schmucker et al.

[11] 4,024,443
[45] May 17, 1977

[54] A.C.-POWERED, COMMUTATED ELECTRIC MOTOR

[75] Inventors: Donald H. Schmucker, Riverdale; Dominic S. Toffolo, Hillcrest Heights, both of Md.

[73] Assignee: The United States of America as represented by the Secretary of the Navy, Washington, D.C.

[22] Filed: Sept. 9, 1975

[21] Appl. No.: 611,733

[52] U.S. Cl. .............................................. 318/175
[51] Int. Cl.² ........................................ H02P 3/76
[58] Field of Search ........... 318/138, 171, 175, 254

[56] References Cited
UNITED STATES PATENTS

| | | | |
|---|---|---|---|
| 3,234,445 | 2/1966 | Calvert | 318/175 |
| 3,612,970 | 10/1971 | Sofan | 318/171 X |
| 3,749,991 | 7/1973 | Kuniyoshi | 318/254 |
| 3,783,358 | 1/1974 | Krauer | 318/175 X |
| 3,829,747 | 8/1974 | Woolfson et al. | 318/175 |

Primary Examiner—Gene Z. Rubinson
Attorney, Agent, or Firm—R. Sciascia; R. Beers; S. Sheinbein

[57] ABSTRACT

A solid-state commutation system comprising the driving of each pair of 180° electrically displaced phases from an even-phased motor with the A.C. current from a dedicated pair of 180° electrically displaced phases of an even-phased A.C. generator by routing the A.C. power per phase pair through a plurality of sets of oppositely disposed thyristor pairs which are gated in accordance with a rotor position-sensor connected to the shaft of the motor rotor.

12 Claims, 7 Drawing Figures

A.C.-POWERED, COMMUTATED ELECTRIC MOTOR

SUMMARY OF THE INVENTION

1. Field of the Invention.

The present invention relates generally to phase-commutated A.C. motors and more particularly to A.C. motors with solid-state commutation.

Ships are usually propelled by low-speed propellers driven through reduction gears by a high-speed prime mover (diesel, steam turbine or gas turbine). Propeller speed changes are achieved by varying the prime mover speed. This arrangement permits the prime mover to operate at its design efficiency at only one ship speed. In the power range required by ship propulsion systems, a multi-speed transmission (such as found in automobiles) is too large and too costly to find widespread application.

One method of circumventing the fixed ratio between the prime mover speed and the propeller speed is to attach a D.C. generator to the prime mover and a D.C. motor to the propeller shaft. Then the ratio of the propeller speed to prime mover speed may be adjusted at will, simply by altering the fields of the generator and the motor. With this arrangement, the prime mover speed may be maintained at its most efficient operating speed for any power required by the propeller to maintain a demanded ship speed. In addition, the direction of the propeller may be reversed by changing the polarity of the voltage applied to the motor. This may be easily achieved by reversing the generator field polarity.

D.C. electrical propulsion systems have other very desirable features; however, mechanical commutation problems prevent building D.C. motors much larger than 10,000 HP per armature. Commutation problems in D.C. generators with conventional mechanical commutators in these sizes limit highspeed operation. Also, the physical size and expense of D.C. electric machines is excessive.

A.C. synchronous electric propulsion systems are somewhat lighter and less expensive; however, they lack the ability to make changes in the ratio of propeller RMP to prime mover RPM which are necessary for maximum prime mover efficiency. Therefore, A.C. synchronous propulsion systems require a controllable pitch propeller to provide varying ship speeds independent of prime mover speed. Low speed A.C. synchronous motors, which operate from a 60 Hz line, have a large diameter in order to accommodate the requisite large number of poles while maintaining an acceptable coupling between the stator and rotor magnetic fields. This large diameter is prohibitive in many modern ship hull designs.

Industry is at the threshold of employing superconducting electric machines. Such machines are either of homopolar design with their high currents and low voltages or of synchronous A.C. design with their complicated field coil and dewar design problems. Both types exhibit a small weight and volume per horsepower making them attractive as high-torque motors. Many uses for such motors (including ship propulsion) require speed control such as is available from a conventional D.C. motor. This invention permits building motors which are driven by a special A.C. generator and provides speed control like a D.C. mechanically commutated motor, but without the limitations which result from a conventional commutator. The A.C. motor operating from a D.C. generator cannot be electronically commutated without additional equipment, as the thyristors would require this equipment (heavy and less reliable) to turn off the thyristors.

A great deal of work has been done recently in employing thyristors to control the speed of electric motors. The complexity of the different controllers has varied widely; cost and reliability has varied directly with their complexity. This invention will provide a very simple thyristor motor controller which will offer low cost and high reliability relative to earlier thyristor A.C. motor controllers. Furthermore, this invention will permit building electric ship propulsion systems which may have high-speed prime movers and low-speed A.C. motors and these A.C. motors will exhibit the characteristics of a D.C. electric propulsion system. The motor will have a small number of poles ad a correspondingly small diameter which is a function of the number of poles and of the pole pitch required to provide an acceptable coupling between the rotor and stator magnetic fields.

SUMMARY OF THE INVENTION

Briefly, the present invention accomplishes the foregoing by routing an essentially D.C. current from dedicated phases of an even-phase A.C. power source through a plurality of sets of oppositely disposed thyristors to the dedicated phases of an even phase A.C. motor armature winding. A position-sensing device is connected to the motor shaft, which generates and applies control signals to the control input of the thyristors in accordance with the relative position of the motor armature with respect to the field. The position-sensing device, by energizing different selected sets of of thyristors, enables each 180 degrees electrically displaced dedicated motor windings to receive current from a dedicated pair of phases of an even phase electrical power source in a cylic fashion in accordance with the relative position of the motor rotor. As a consequence the present system has all of the advantages of a conventionally commutated D.C. motor without the attendant physical size limitations of the rotating commutator.

OBJECTS OF THE INVENTION

An object of the present invention is to control the speed, power and direction of rotation of a low RPM high-torque shaft relative to a high-speed low-torque rotating shaft (as is found in ship, railroad and other propulsion systems) with reduced complexity and high reliability.

A further object is to commutate an A.C. input into a motor via a solid-state switching bank.

A still further object is to provide motor-speed and power control such as is available from conventional D.C. motors for high-torque high-power electric machines (which may employ superconducting windings).

A still further object is to provide a motor-speed control system by which motor speed changes may be accomplished by either 1) varying the generator rotational speed, 2) varying the generator field strength, 3) varying phase angle control of the firing of the thyristors, 4) varying the motor field strength or 5) by reducing the voltage applied to the motor with resistors, capacitors, inductors, transformers, magnetic amplifiers, transistors, diodes, linear reactors, or saturating reactors.

DETAILED DESCRIPTION OF THE INVENTION

Some brief introductory remarks are in order. In general terms, the phase-commutated A.C. generators and A.C. motors consist of rotating field windings inside stationary armatures. The rotating field configuration is in no way related to the phase-commutation concept and when applied to machines which have superconducting field windings, holding the field windings stationary either inside or outside of a rotating armature, may be more desirable. Slip rings are then required to transfer power to the motor phase windings.

The basic switching device utilized to form the present commutating system is the thyristor. A thyristor is a solid-state device which behaves like a thyratron tube in that it passes current in only one direction if its gate or control input in biased properly. Typical examples of the thyristor are the silicon-controlled rectifier (SCR) and the light-activated silicon-controlled rectifier (LASCR). The presence of an "on" signal applied to the gate lead of the thyristor causes the thyristor to be active, i.e., the thyristor behaves like a diode. An "off" signal on the gate lead causes the thyristor to become inactive when the polarity of the voltage applied to the power terminals of the thyristor becomes negative, thus opening the circuit.

It should be understood that, although the present invention is implemented in this description with thyristors, any type of switch which can be gated to pass current in one direction may be utilized.

Another device, which may find application within the scope of this invention, is the bidirectional SCR also referred to as a Triac. This device will pass current in either directions when properly gated. With this device, only half the number of thyristors are required, however the gate logic is more involved.

The following is an overall explanation of the invention, which consists of a specially designed generator being driven by a high-speed prime mover, a motor driving a low-speed rotating shaft (which may be connected to a ship's propeller) and a phase-commutation thyristor bank.

EQUIPMENT

The generator required has an even number of phases so that it may be characterized as a $2 \times n$ ($n$ is an integer) polyphase machine. Since the output of the generator is rectified and supplies a load including an opposing voltage, no attempt will be made to achieve a sinusoidal output voltage. An ideal generator, for this application, would produce a square wave voltage waveform which may be approximated by a generator producing a trapezoidal voltage waveform.

The motor design is much like the generator that supplies the A.C. power. It has the same number of phases as the generator, but it may have the same or different number of poles. Due to the present design, there is no need to relate the number of motor poles to the number of generator poles by the ratio of the generator RPM's to the motor RPM's as in most prior art A.C. machines. The rotational speed of the motor is dependent upon the average voltage applied to the motor and the motor magnetic field strength. No D.C. bus is established and the solid-state rectification and commutation process is accomplished between dedicated phases of the generator and the motor. Two phases of the A.C. generator are connected by means of the thyristors to two phases of the A.C. motor forming an A.C. generator-A.C. motor dedicated phase commutation pair in this context, dedicated means that the same two A.C. generator windings are always connected to the same two A.C. motor windings and never to any other windings. This type of phase pairing is made for all $2 \times n$ phases of both A.C. generator and A.C. motor.

The A.C. motor requires a position sensor attached to its shaft which reports the angular location of the armature conductors with respect to the magnetic field poles and provides signals indicating the magnetic field polarity seen by each armature phase and the precise instant of time when an armature phase experiences a change in magnetic field polarity. The output of the position sensor is connected to the phase-commutation thyristor bank and controls which thyristors are active or inactive depending on the direction of the rotation, speed and field polarity relative to the position of the armature conductors.

The phase-commutation thyristor bank consists of $8 \times n$ thyristors (eight for each phase pair) which control the A.C. motor phase currents, the thyristors' associated gate circuits, and the A.C. motor reversing switch and A.C. motor braking hardware (for any application which requires A.C. motor direction reversal). The solid-state rectification ad commutation are accomplished between dedicated phases of the A.C. generator and the A.C. motor. A pair of A.C. generator phases is connected by means of the thyristor to a dedicated pair of A.C. motor phases. This is done for all $n$ pairs of phases for both the A.C. motor and A.C. generator; hence, this invention requires even ($2 \times n$) phase electric machines, or an even phase secondary winding of transformers with conventional 3 phase primaries.

TRANSIENT OPERATION

The above-described invention is further explained with reference to FIG. 1 which shows two phases 14 and 20 of a 2×n-phase star-connected A.C. generator, two phases 24 and 28 of a 2×n-phase star-connected A.C. motor and eight thyristors 31–34 and 39–42 of an 8×n thyristor phase-commutation thyristor bank. The other 2(n-1) phases are all the same and need not be discussed at this time. The A.C. generator and A.C. motor phase pairs are chosen such that the two phases are 180 electrical degrees apart. At startup of the A.C. motor, the position sensor is energized to apply on or off signals to the thyristor gates and the A.C. generator field is reduced to lower the line voltage and reduce the starting current. The phase-commutation thyristor bank directs the electric current to the appropriate A.C. motor conductors which results in an accelerating torque on the A.C. motor shaft.

As long as the motor A.C. dedicated phase conductors of an arbitrary phase, j, (24) and its 180 electrical degrees displaced phase, j + n, (28) are moving under the same pole pair, respectively, (i.e., a north magnetic pole for phase j; and a south magnetic pole for phase j + n, or vice versa), the current in these phases is not allowed to reverse its direction.

Several cycles of voltage alternation of a phase pair of the A.C. generator occur before the pole face completes its traverse across any armature conductor. That is because the gates of the thyristors labeled on continue to receive on signals from the shaft position sensor until the field pole completes its traverse across the armature conductor. Likewise, the gates of the thyristors labeled off continue to receive off signals. As a magnetic pole passes one A.C. motor armature conductor and goes to the next, the position sensor causes the thyristor gate signals which are associated with that A.C. motor armature phase to change. When the change in the gate signal occurs, the current in the respective A.C. motor armature conductors changes and maintains torque in the same direction. The A.C. motor shaft continues to accelerate until a back electromotive force (EMF) is generated which reduces the armature current such that the developed torque is just equal to the torque required to rotate the load. The rotor then ceases to be accelerated and a steady-state speed and torque condition is achieved.

STEADY STATE

Figure 1:
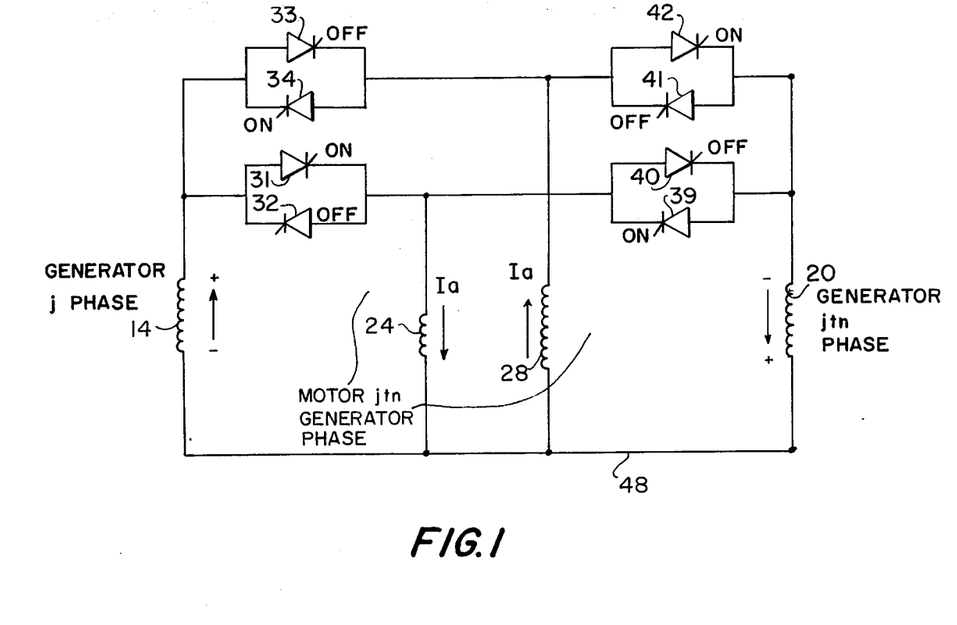
FIG. 1 is a schematic circuit diagram of the current routing between a single dedicated A.C. generator-phase pair and its related dedicated A.C. motor-phase pair.
Figure 4:
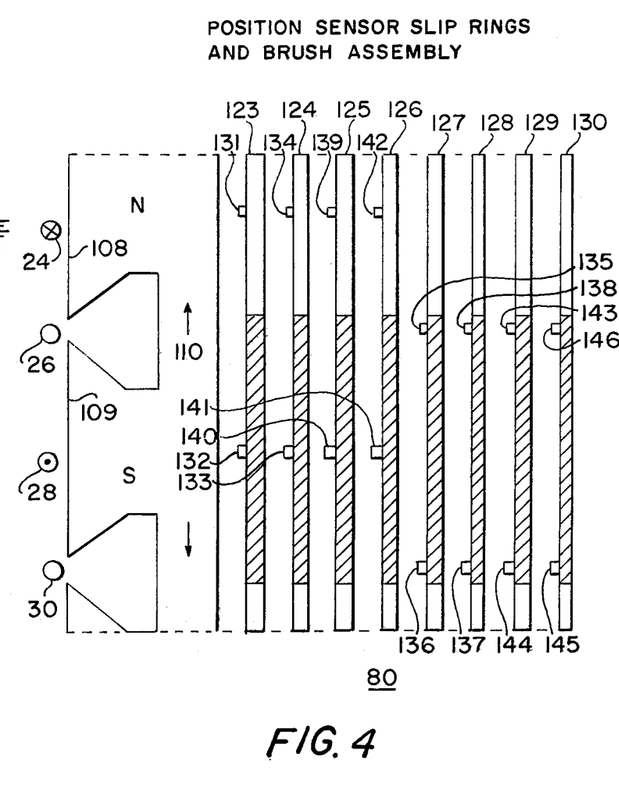
FIG. 4 is a schematic diagram of an unwound cross-sectional view of the rotor taken perpendicular to its center shaft and juxtaposed with the unraveled circumference of the position-sensing slip-ring assembly.

At the steady state condition and when the A.C. motor armature phase conductor 24 requires current into neutral to produce torque in the required direction, then the A.C. motor phase conductor 28 has current away from neutral and the position sensor FIG. 4 applies on and off signals to the eight thyristor gates as shown in FIG. 1. Tracing the conduction paths: when the voltage of the A.C. generator phase j 14 is positive with respect to neutral and is greater than the back EMF generated by the A.C. motor phase j 24, conduction occurs through thyristor 31 and the A.C. motor phase j 24. Simultaneously, the voltage of A.C. generator phase j + n 20 is negative with respect to neutral and is of greater magnitude than the back EMF of A.C. motor phase j + n 28 resulting in conduction through thyristor 42 and A.C. motor phase j + n 28. Likewise, when the voltage of A.C. generator phase j 14 is negative with respect to neutral and is of greater magnitude than the back EMF of A.C. motor phase j + n 28, conduction occurs through thyristor 34 and A.C. motor phase j + n 28. At the same time, the voltage of generator phase j + n 20 is positive with respect to neutral and is greater than the back EMF in the A.C. motor phase j 24 and conduction occurs through thyristor 39 and the A.C. motor phase j 24. As previously mentioned, when the A.C. motor magnetic pole face completes its traverse across the A.C. motor phase pair and goes on to the next A.C. motor phase pair, the direction of the current in the A.C. motor-armature phase conductors j and j + n 24 and 28 must change to maintain torque in the same direction. To make the change, the position sensor FIG. 4 changes all the thyristor gate signals which are associated with the A.C. motor phases j and i j + n 24 and 28. The position sensor first applies off signals to the gate of thyristors 31, 34, 39, and 42 causing them to be "inactive" within one-half A.C. generator voltage cycle. A short time later the position sensor will apply on signals to the gates of thyristors 32, 33, 40, and 41 causing them to be active. Thus, current in the A.C. motor phase j 24 is now away from neutral and current in the A.C. motor phase j + n 28 is into neutral.

Tracing the conduction paths: when the voltage of generator phase j 14 is positive with respect to neutral and is greater than the back EMF of the A.C. motor phase j + n 28 conduction occurs through thyristor 33 and A.C. motor phase j + n 28. Simultaneously, A.C. generator phase j + n 20 is negative and is of greater magnitude than the back EMF of motor phase j 24. Thus conduction will occur through thyristor 40 and the A.C. motor phase j 24. A similar process occurs when the A.C. generator phases reverse polarity.

REVERSING ROTATION

The direction of rotation may be changed by providing a switch which 1 interrupts the gate signals, 2 delays one-half A.C. generator voltage cycle before closing and 3 changes all of the thyristor gate signals such that the signals which were on are changed to off and vice versa. When the switch is changed, the direction of current in the A.C. motor phases reverse causing reverse torque to be applied to the A.C. motor shaft.

DYNAMIC BRAKING

If it is required to stop the A.C. motor which is driving a load with a high inertia, the A.C. motor may be dynamically braked by first disconnecting the position sensor from the phase-commutation thyristor bank and applying off signals to all of the thyristors causing them to become inactive within one-half A.C. generator voltage cycle, cutting the prime mover throttle to prevent prime mover overspeed resulting from loss of load as the load as the thyristors are signaled off, disconnecting the A.C. generator while at zero current and inserting a properly 2×n-phase resistor load, actuating a switch which applies on gate signals to all thyristors, permitting the A.C. motor to deliver power to the resistive load. The value of the resistance and the A.C. motor field strength may be altered to maintain the current close to the rating of the thyristors.

SPEED CHANGING

Figure 2:
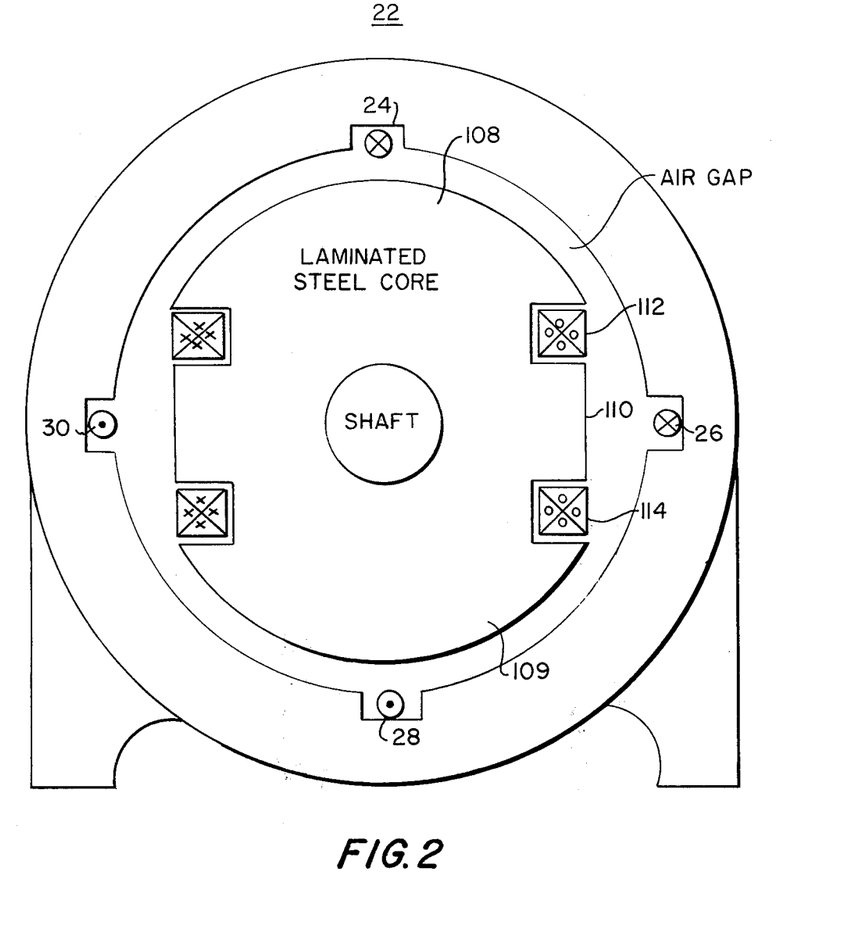
FIG. 2 is a schematic end view of a 2-pole 4-phase A.C. motor, used for convenience in describing the invention.
Figure 3:
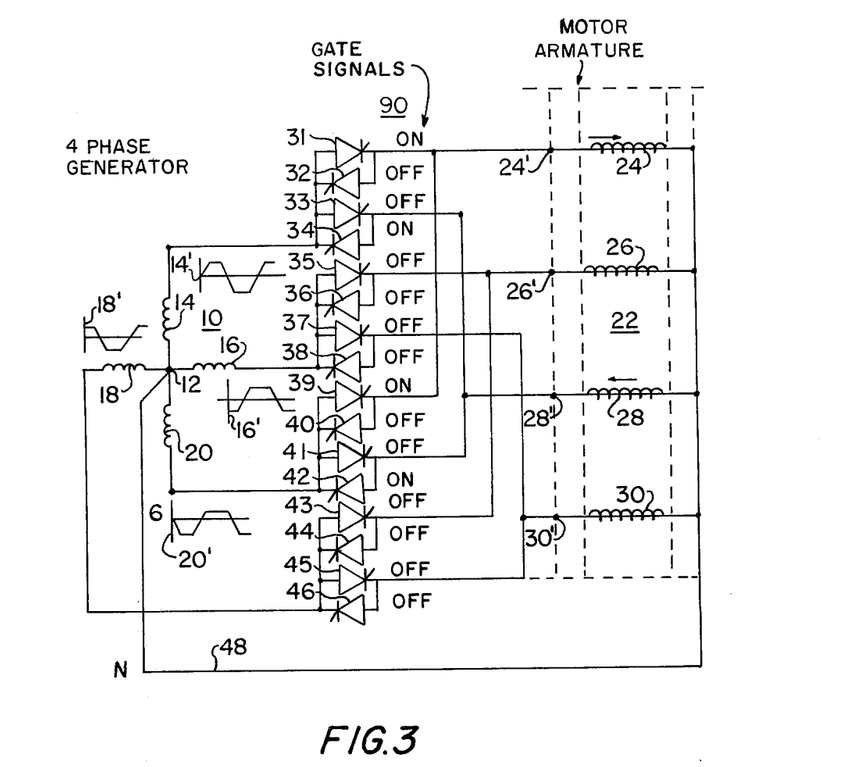
FIG. 3 is a schematic diagram of one embodiment of the switching bank of the present invention.

The following is an explanation of a speed-changing system utilizing the A.C. generator-A.C. motor dedicated phase-pairings scheme explained generally in FIG. 1. The FIGS. 2, 3, and 4 show a high-speed high-frequency electric A.C. generator 10 (FIG. 3) powering a low-speed electric A.C. motor 22 (FIGS. 2, 3, 4), with its attached position sensor 80 FIG. 4 through a phase commutation and rectification thyristor bank 90 (FIG. 3).

GENERATOR

In order to simplify the explanation, the electric A.C. generator 10 (FIG. 3) has four windings 14, 16, 18, 20 which are star-connected and separated from each other by 90 electrical degrees. The phase voltage versus time relationship is shown on plots 14', 16', 18', 20', FIG. 3 for each phase. The frequency should be high, and is independent of the A.C. motor operation. For example, the frequency could be 250 Hz, at a motor speed 100 RPM or the frequency could be 250 Hz, at a motor speed of 200 RPM.

MOTOR

The motor FIG. 2 has two rotating magnetic poles, 108 being the north pole and 109 being the south pole. The salient pole field is shown as having a magnetic core 110 and a pair of field windings 112 and 114 which may or may not be superconducting. For the superconducting-type machine, the field winding would be a superconducting air-core coil. The armature winding consists of four star-connected phases 24, 26, 28, 30 which have one conductor per phase, one-half turn each for illustrative purposes, with the phase terminals 24', 26', 28', 30' located on one side of the armature and the neutral terminal 48 located on the other side (see FIG. 3).

FIG. 4 shows an unwound cross-sectional view of the rotor core 110 taken from a plane perpendicular to the axis of the rotor core and juxtaposed against a view of the circumference of the slip rings 123–130 unrolled to lie flat in the plane of the paper while maintaining the relative position of the field pole, armature winding and slip rings. Such a juxtaposition is advantageous in that it shows how the pole faces and the armature windings align with the conducting portions of the slip rings 123–130. The direction of armature current relative to the magnetic field poles 108–109 is indicated by A.C. motor armature conductors 24, 26, 38, 30 shown schematically as perpendicular to the plane of FIG. 4. The cross in the A.C. motor armature conductor 24 indicates that the direction of current is into the paper. The dot in the A.C. motor armature conductor 28 indicates the direction of current is out of the paper. No dot or cross in conductors 26 and 30 indicates zero current in these conductors. It should be understood that this is an oversimplified motor; however, one may also consider each phase of this machine as consisting of a coil with an arbitrary number of turns. One side of a phase coil could rest in the top of one slot, and the other side of the phase coil could rest in the bottom of the slot 180 electrical degrees away. The next phase coil would be placed 90 electrical degrees away in a similar fashion, and so on around the armature. This machine could still be star-connected and the basic concept would not be changed. However, all connections are made on the same side of the machine. The current into the A.C. motor phases 24, 26, 28, 30 is controlled by a phase-commutation thyristor bank 90 (FIG. 3) which consists of thyristors 31–46 and their associated trigger circuits, dynamic braking and reversing elements. The timing of the thyristor firing is determined by a shaft position sensor 80 which is attached to the A.C. motor shaft.

SHAFT POSITION SENSOR

The shaft position sensor 80 FIG. 4 is described such that it provides complete isolation between individual thyristor gate circuits. The shaft position sensor for a four-phase system could consist of eight rotating slip rings 123–130 and 16 stationary carbon brush pairs 131–146. Each of the eight slip rings 123–130 consists of a smooth, circular ring having a conducting periphery with slightly more than 180 degrees of the periphery insulated. The eight rings are aligned with their axes on the rotor shaft axis and their non-insulated surface in the same angular position and are also aligned to be in direct angular relationship with the north magnetic field pole 108. The insulated portions of the slip rings are then in direct angular relationship with the south magnetic field pole 109. Each of the eight slip rings is connected by way of the brushes and thyristor gate circuits to the cathode or anode of the thyristors which it is to switch. (The cathode or anode connection is the reason for the isolation of the gate source trigger circuit). Each carbon brush pair consists of a lamination of two brushes separated by a layer of insulation which comprises a switch that is closed when it is resting or sliding on the conducting portion of a slip ring and is open when it is resting or sliding on an insulated portion of a slip ring. The brush pairs are connected to the phase-commutation thyristor bank gates through appropriate circuits to cause the thyristors to be active when the connected brush pair is contacting the conducting portion of the slip ring.

Brush pairs 131, 132 are held on slip ring 123 by two brush holders which are located 180 electrical degrees apart and are positioned such that brush pair 131 is in direct angular relationship with motor armature phase conductor 24 and controls the gate of thyristor 31. Likewise, brush pair 132 is in direct angular relationship with A.C. motor armature phase conductor 28 and controls the gate of thyristor 32. Brush pairs 133, 134, 139, 130, 141, 142 are held in a similar fashion on slip rings 124–126. Brush pairs 135 and 136 are held on slip ring 127 by two brush holders which are located 180 electrical degrees apart. Brush pair 135 controls the gate of thyristor 35 and is positioned such that it is in direct angular relationship with motor armature phase conductor 26 which is 90 electrical degrees away from motor armature phase conductor 24. Likewise, brush pair 136 is in direct angular relationship with motor armature phase conductor 30 and controls the gate of thyristor 36. Brush pairs 137, 138, 143, 144, 145, 146 are held in a similar fashion on slip rings 128–130.

A convention has been established such that, when brush pair 1X is running on a conducting portion of its slip ring, thyristor X is active and brush pair 1Y, which is 180 electrical degrees away from brush pair 1X and is on the same slip ring, is running on the insulating portion of the slip ring, thus making the thyristor Y inactive. With this arrangement, electrical isolation is insured between brush pairs and the thyristor gate circuits, since the brush pair on the surface of the slip ring will go off the conducting portion before the brush pair on the insulating surface reaches the conduction portion of the slip ring.

With the A.C. motor 22 at standstill as shown in FIG. 4, the A.C. generator voltage is decreased by speed and field reduction to limit the starting current. When the position sensor is initially energized, currents in the phase-commutation thyristor bank 90 and A.C. motor-armature conductors are shown in the FIG. 4. The interaction of the magnetic field produced by these currents with the A.C. motor rotor magnetic field produces a torque on the shaft of the A.C. motor which causes the rotor and slip rings to turn in the direction shown (shematically down the page). A short time later, the field and slip rings have moved such that brush pairs 135, 138, and 143, 146 contact the conducting portion of their respective slip rings causing thyristors 35, 38, 43 and 46 to become active and permit current in the A.C. motor phase conductors 26 and 30.

The present configuration persists for many A.C. generator voltage cycles. Eventually, the torque on the rotor causes the leading edge of the rotor north pole to move adjacent to armature phase conductor 28. At this time, brush pairs 131, 134 and 139, 142 are contacting the insulated portion of slip rings 123, 124, 125 ad 126 causing an off signal to be applied to the gates of thyristors 31, 34, 39 and 42 which become inactive as soon as they are reverse-biased by the next A.C. generator half cycle. Now, no current is present in A.C. motor phase conductors 24 and 28. An instant following this condition, brush pairs 132, 133 and 140, 141 contact the conducting portion of slip rings 123, 124, 125 and 126 causing on signals to be applied to the gates of thyristors 32, 33, 40 and 41 which become active. The direction of current in the A.C. motor armature phase conductor 24 is out of the paper and the direction of the current in A.C. motor armature phase conductor 28 is into the paper. Again, the present configuration persists for many generator cycles until the motor shaft rotates 90 electrical degrees resulting in a similar exchange between brush pairs 135, 138, 143, 146 and 136, 147, 144, 145.

The various groups of thyristors continue to be made active or inactive by the position sensor such that the rotor continues to be accelerated in the same direction. As the A.C. motor rotor turns, an electromotive force is generated in the A.C. motor armature conductors which is proportional to the A.C. motor speed and field strength and opposes the A.C. generator voltage and causes a decrease in the conductor current. Eventually the A.C. motor rotor accelerates to a steady state speed where the motor electromotive force reduces the magnitude of the motor armature current to produce a torque which just equals the torque required in turn the shaft and load with no acceleration. Steady-state speed is maintained until a change is made in the operating conditions.

A second embodiment of the position sensor which may be used to implement the present invention is described with reference to the FIGS. 5, 6, and 7.

LASCR SWITCH

Figure 5:
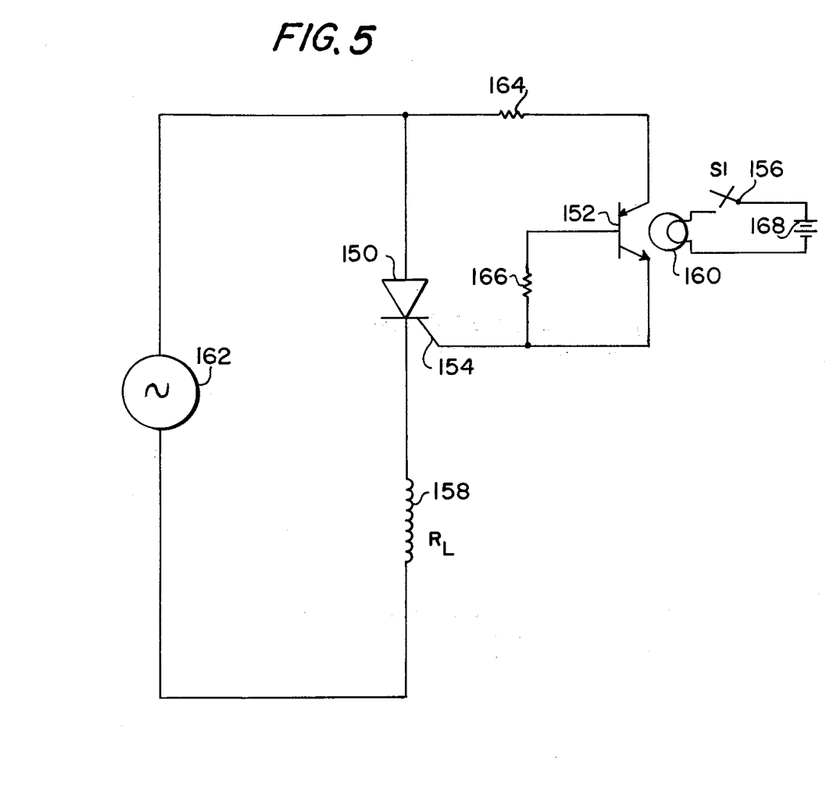
FIG. 5 is a schematic circuit diagram of the switch mechanism for a second embodiment of the position-sensing device.

FIG. 5 shows a schematic diagram of a common SCR thyristor switch 150 employing a Light-Activated Silicon-Controlled Rectifier (LASCR) 152 to control the SCR gate lead 154. The LASCR 152 provides isolation between the trigger source 156 and the SCR gate lead 154. A LASCR is a small SCR with a glass window to permit triggering by means of light as well as by the normal electrical gate signal. The external resistance 166 between the gate and the cathode of the LASCR (in addition to bias voltage and current) determines the light sensitivity of the LASCR since the gate current caused by the light originates within the silicon pellet. The LASCR is triggered into the conducting state when the radiant energy falling on it exceeds a given threshold level.

The circuit functions as a half-wave rectifier when the trigger source 156 is activated and supplies half-wave current pulses to the load 158. Activation of the trigger source 156 allows power from a small power supply 168 to be applied to the light source 160, which furnishes the appropriate radiation wavelengths and intensities to trigger the LASCR 152 into the conducting state (providing the alternating current power supply 162 has forward-biased the LASCR). The LASCR supplies gate current to the SCR 150 and causes it to conduct (again providing the SCR is forward-biased). If the trigger souce 156 is removed while the SCR 150 and the LASCR 152 are conducting, they will continue to conduct until reverse-biased by the alternating current power supply 162. The LASCR 152 and the SCR 150 then cease to conduct. Neither will conduct from this time on until the LASCR 152 becomes forward-biased when the trigger source 156 is again activated. Resistor 164 limits the SCR 150 gate current via its biasing of the LASCR 152 and resistor 166 determines the sensitivity of the LASCR 152.

The above-described LASCR-controlled SCR half-wave switch of FIG. 5 may be simply substituted for the thyristors shown in FIG. 1. Since the light source triggering of the LASCR inherently isolates each SCR from its switch circuitry, the triggering circuits for the thyristors 31, 34, 39, and 42 may be combined as may the circuits for the thyristors 32, 33, 40, and 41. FIG. 6 shows the circuitry for this type of light-source combination wherein the light sources for the thyristors 31, 32, 33, 34, 39, 49, 41, and 42 (FIG. 1) are controlled by the light sources 231, 232, 233, 234, 239, 240, 241, and 242 respectively. The switches S1 and S2 are formed by a single slip ring and two brush pairs.

Figures 6, 7:
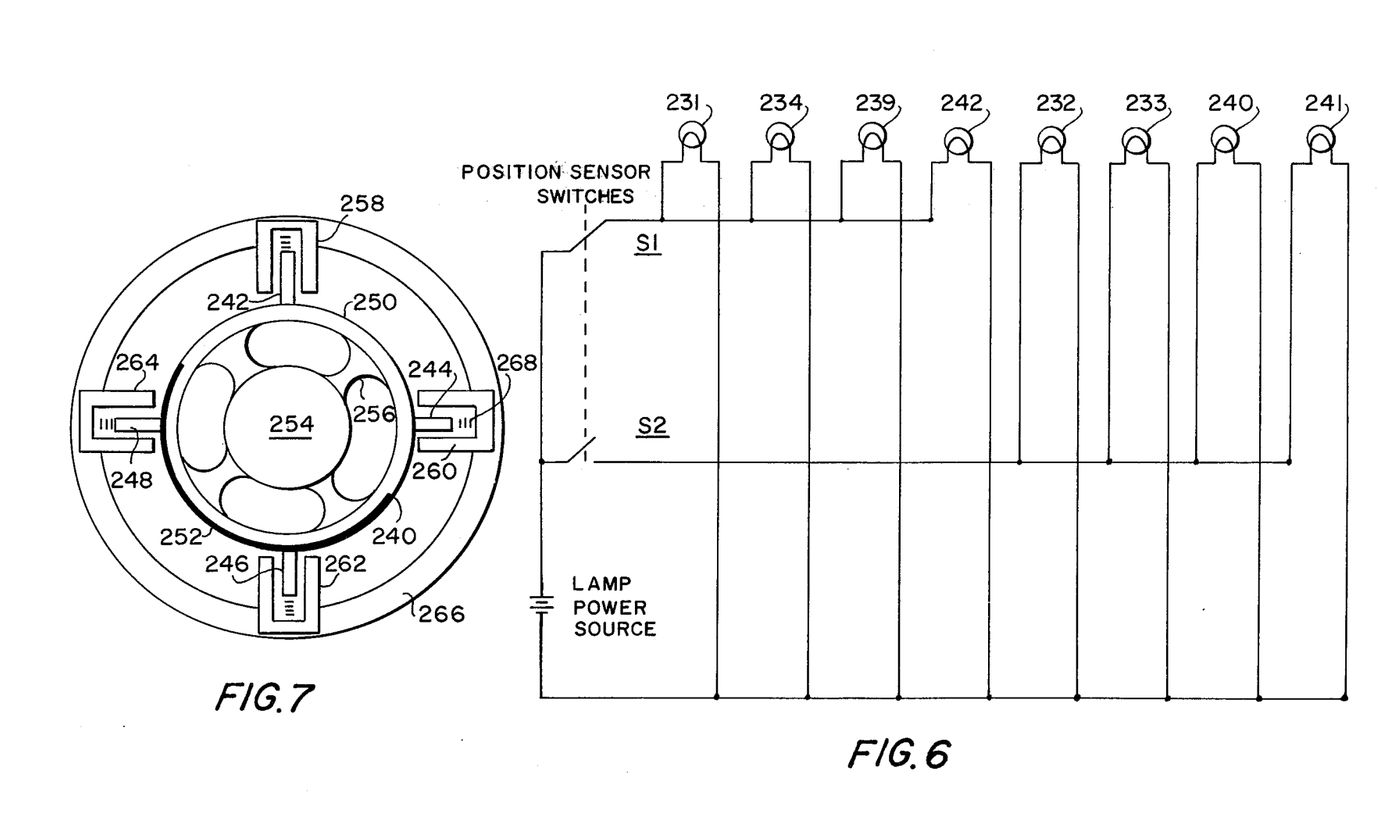
FIG. 6 is a schematic diagram of the lamp circuitry for this second embodiment of the position-sensing device.
FIG. 7 is a schematic end view of the brush-slip ring assembly for the second embodiment of the position sensing means.

An alternate slip ring-brush assembly made possible by th LASCR-controlled SCR's and which may be utilized to gate the thyristors of FIG. 3 is shown in FIG. 7. The position sensor comprises a single slip ring 240 and four insulated carbon brush pairs 242, 244, 246, and 248. One-half of the slip ring 240 is conducting (250) and one-half has an insulating covering (252). The slip ring 240 is supported by the A.C. motor shaft 254 and spider 256 in direct angular relationship with the A.C. motor magnetic field position. Four carbon brush pairs 242, 244, 246, 248 are positioned at 90 electrical degree intervals around the periphery of the slip ring 240 and are held in place by insulated brush holders 258, 260, 262, 264, which are held by a brush holder supporting bracket 266. The individual insulated brush pairs are pushed against the periphery of the slip ring 240 by constant pressure springs 268 located in the brush holders 258, 260, 262, 264. It is important to note that, now, one insulated brush pair has taken the place of four separte brush pairs in FIG. 4. Isolation between brush pairs is not critical and multiple brushes may be resting on a conducting portion of the slip ring simultaneously.

Further modifications of the above described invention may occur to persons skilled in the art and may take the form of multiple-phase, multiple-pole, A.C. generator-A.C. motor, phase-rectification speed controllers, improved thyristors and thyristor gate circuits and shaft position sensors (these may be of the mechanical variety described or of other means which may include electromechanical, electromagnetic and electrooptical shaft position sensors). All such modifications are considered to be within the scope of the invention described above.

In summary, the present method of relating 180 electrical degree displaced phase pairs in an even-phased A.C. generator to 180 electrical degree displaced dedicated phase pairs (in the same number as the generator) in an even-phased A.C. motor via a thyristor bank under the control of an A.C. motor-rotor position-sensing means achieves a simultaneous rectification and commutatin of the A.C. power output of the A.C. generator. This design dispenses with the need for a rotating commutator with its attendant maintenance problems, the need for interphase transformer coupling in the power circuitry, and the need for a complex activation and deactivation scheme for the thyristor bank. The A.C. motor speed is made completely independent of the A.C. generator frequency. Thus the A.C. motor speed may be adjusted in accordance with the load requirements while the A.C. generator and prime mover are run at their optimum speed.

More specifically, the advantages of this invention include, but are not limited to, the ability to design low-weight, high-density, high-power electric machines with high or low RPM's which may be combined in systems providing a wide range of A.C. motor speed control, the ability to do this with reduced controller complexity, the ability to reverse the A.C. motor direction without load-breaking switches, the ability to use electrical dynamic braking of the A.C. motor and its load, and the independence of the number of A.C. motor pores from its speed and the frequency of the A.C. power supply.

This invention does not require as many high-current liquid-metal current collectors as the homopolar machines and in certain embodiments does not require any. This invention permits the design of higher voltage systems and opens the possibility of designing superconducting electric machines with even higher active flux densities in the armature conductors resulting in reduced machine size and weight.

Various alternatives exist in this invention. Alternatives include the selection of the generator frequency, selection of different even numbers of phases, selection of the number of A.C. motor poles (independent of its RPM), selection of the switching device (thyristor, etc.), selection of the number of parallel circuits to carry the load current and the A.C. voltage generated per phase, selection of the thyristor gate and phase angle firing circuitry and selection of the position sensor design. The choice of these alternatives is dependent upon the application being considered.

If it is not practical to install a dedicated even-phase A.C. generator, one may consider using a three-phase transformer with an even phase secondary (generator than two) which is permitted to magnetically saturate (this will provide a quasi-trapezoidal voltage waveform under load which improves the thyristor conduction time, armature loading and armature utilization). With this arrangement, it is possible to operate an even phase A.C. motor through a phase-commutation thyristor bank from the three-phase 60 Hz utility system.

Obviously, many modifications and variations of the present invention are possible in light of the above teachings. It is therefore to be understood that, within the scope of the appended claims, the invention may be practiced otherwise than as specifically described.

What is claimed is:

1. A phase-commutated A.C. motor speed and power controller comprising:

alternating current power supply means with an even number of phases for providing a plurality of pairs of 180° electrically displaced phased currents;

A.C. motor means with the same even number of phases as said A.C. power supply means and having at least one magnetic field pole pair and an armature with a plurality of pairs of 180 electrical degree separated phase windings;

position-sensing means for sensing the relative positions of the magnetic field pole pairs and the armature windings of said motor means;

a plurality of switching bank means with each switching bank means connecting one pair of 180° electrically displaced phase windings from said power supply means to the corresponding dedicated pair of said 180° electrically separated phase motor armature windings, each of said switching bank means including a plurality of oppositely disposed diode-like switches connected so that the alternating current from said power supply means windings flows continuously through said switching bank means and is converted into two direct current ripple voltages of opposite polarity which are applied across said motor armature windings, each of said diode-like switches having a control input to which a control signal may be applied to switch on the flow of current between an anode input and a cathode input of the diode-like switch, said current flow between the anode and cathode stopping whenever both said control signals is removed from said control input and also the voltage applied by said power supply means between said cathode and anode inputs falls to zero, said position-sensing means applying control signals to said control inputs in accordance with the relative position of the armature windings and field windings of said motor means in such a manner that the current through said armature windings always generates magnetic fields tending to force the rotor of the motor to rotate in the same direction.

2. A phase-commutated A.C. motor-speed and power controller as defined in claim 1, wherein said position-sensing means comprises:

brush assembly means comprising a set of brush pairs for each set of oppositely disposed diode-like switches; and a plurality of electrically isolated slip ring means, one for each set of oppositely disposed switches, said slip rings means being disposed on said A.C. motor means so that there is relative rotation to said brush assembly means, each of said slip ring means having a portion of its surface being conductive, said brush assembly means being suitably disposed to contact the slip ring means and to energize each diode-like switch when its respective brush pair contacts the conductive surface of said slip ring means.

3. A phase-commutated A.C. motor-speed and power controller as defined in claim 1, wherein said position-sensing means comprises:

plurality of means for sensing the presence of light above a certain threshold energy, a different one of said sensing means connected to said control input of each diode-like switch;

plurality of light source means, a different one of said light source means disposed to energize each of said sensing means;

slip ring means with a portion of its surface being conductive disposed on said A.C. motor means; and plurality of brush means suitably disposed around the circumference of said slip ring means to contact said slip ring means, each brush means being connected to energize a different set of light source means when said brush means contacts the conductive surface of said slip ring means.

4. A phase-commutated A.C. motor-speed and power controller as defined in claim 1, wherein said oppositely disposed diode-like switches are thyristors.

5. A phase-commutated A.C. motor-speed and power controller as defined in claim 1, wherein the current from each phase of a pair of 180° electrically displaced phases of said power supply means is delivered by way of two sets of oppositely disposed diode like switches to both windings of the corresponding dedicated pair of the 180° electrically displaced phases of the armature windings of the said A.C. motor means to which the said sets of diode-like switches are connected.

6. A phase-commutated A.C. motor-speed and power controller as defined in claim 1, wherein each of said pairs of 180° electrically displaced phases of the A.C. power supply means is connected to a corresponding dedicated pair of 180° electrically displaced phases of the armature windings in said A.C. motor means as follows:
   one phase winding of said A.C. power supply means is connected by one of the said sets of oppositely disposed diode like switches to a first winding of said dedicated pair of armature windings of said A.C. motor means and is connected by a second set of oppositely disposed diode-like switches to the second winding of said dedicated pair of 180° electrically displaced armature phase windings of said A.C. motor means; and
   the 180° electrically displaced phase winding of said A.C. power supply means is connected by a third set of oppositely disposed diode like switches to said first winding of said dedicated pair of armature windings of said A.C. motor means and is connected by a fourth set of oppositely disposed diode-like switches to said second winding of said dedicated pair of armature windings of said motor means so that an essentially D.C. current is applied into one of said phase windings of said dedicated pair of armature windings of said motor means and back through the second phase winding of said dedicated pair of armature windings of said motor means to the A.C. power supply means when selected switches from the four sets of oppositely disposed diode-like switches are energized by said position-sensing means and, said essentially D.C. current being reversed through said windings of the dedicated pair of armature windings of said A.C. motor means when a different set of selected switches from said four sets of oppositely disposed diode-like switches is energized.

7. A phase-commutated A.C. motor speed and power controller comprising:
   alternating current power supply means with an even number of phases for providing a plurality of pairs of 180° electrically displaced phase currents;
   A.C. motor means with an armature with a plurality of windings of the same number of phases as said A.C. power supply means and having at least one field pole pair;
   position-sensing means for sensing the angular location of the magnetic field poles with respect to the armature conductors of said motor means;
   a plurality of switching bank means, each switching bank means comprising a plurality of sets of oppositely disposed diode-like switches connecting one pair of 180° electrically displaced phase windings of the A.C. power supply means to the corresponding dedicated pair of 180° electrically displaced armature windings in the said A.C. motor means so that an essentially D.C. current is applied by said pair of windings of said A.C. power supply means to its corresponding dedicated pair of said armature phase windings of said A.C. motor means so that each of said A.C. power supply means windings is supplying current continuously to said A.C. motor means windings, each of said diode-like switches having a control input for switching on current flow between two other inputs, said diode-like switches continuing to conduct current after said control signals are removed from said control inputs until such time as the voltage applied to the switch by said A.C. power supply means goes to zero, said position-sensing means applying control signals to said control inputs of said diode-like switches of said switching bank means so that said essentially D.C. current of a given polarity is applied to that respective dedicated pair of armature phase windings of said A.C. motor means only when those armature phase windings are opposite predetermined magnetic field poles.

8. A phase-commutated A.C. motor-speed and power controller as defined in claim 7, wherein said position-sensing means comprises: a plurality of electrically isolated slip ring means, one for each set of oppositely disposed diode like switches, said slip ring means being disposed on the shaft of said motor means so that they rotate relative to said armature windings, each of said slip ring means having a portion of its surface being conductive; and
   a brush means comprising a pair of brushes for each oppositely disposed diode-like switch of the switching bank means, suitably disposed to contact the slip ring means for that diode-like switch and to energize each diode-like switch when its respective brush air contacts the conductive surface of said slip ring means.

9. A phase-commutated A.C. motor speed and power controller as defined in claim 7, wherein said position-sensing means comprises;
   plurality of means for sensing the presence of light above a certain threshold energy, a different one of said sensing means connected to said control input of each diode-like switch;
   a plurality of light source means, a different one of said light source means disposed to energize each of said light sensing means;
   slip ring means with a portion of its surface being conductive disposed on the rotor shaft of said motor means; and
   a plurality of brush means suitably disposed around the circumference of said slip ring means to contact said slip ring means, each brush means being connected to energize a different set of light source means when it contacts the conductive surface of said slip ring means.

10. A phase-commutated A.C. motor-speed and power controller as defined in claim 7, wherein said oppositely disposed diode-like switches are thyristors.

11. A phase-commutated A.C. motor-speed and power controller as defined in claim 7, wherein each phase from a pair of 180° electrically displaced phase windings from said power supply means is connected by one of said sets of oppositely disposed diode-like switches to one winding of the corresponding dedicated pair of 180° electrically displaced phase armature windings of the A.C. motor means to which it is coupled and is connected by another of said sets of oppositely disposed diode-like switches to the 180° electrically displaced phase winding from the same dedicated pair of armature windings of the A.C. motor means.

12. A phase-commutated A.C. motor-speed and power controller as defined in claim 7, wherein each of said pairs of 180° electrically displaced armature phase windings of the A.C. power supply means is connected to a corresponding dedicated pair of 180° electrically displaced phases of the armature windings in said motor means as follows:

one phase winding of said A.C. power supply means is connected by one of said sets of oppositely disposed diode-like switches to a first winding of said dedicated pair of related armature windings of said A.C. motor means and is connected by a second set of oppositely disposed diode-like switches to the second winding of said dedicated pair of 180° electrically displaced armature phase windings of said A.C. motor means; and the opposite-phase winding from said pair of 180° electrically displaced phase windings of said A.C. power supply means is connected by a third set of oppositely disposed diode-like switches to said first winding of said dedicated pair of armature windings of said A.C. motor means and is connected by a fourth set of oppositely disposed diode-like switches to said second winding of said dedicated pair of armature windings of said motor means so that an essentially D.C. current is applied into one of said phase windings of said dedicated pair of armature windings of said motor means and back through the second phase winding of said dedicated pair of armature windings of said motor means to the A.C. power supply means when selected switches from the four sets of oppositely disposed diode-like switches are energized by said position-sensing means and, said essenitally D.C. current being reversed through said windings of the dedicated pair of armature windings of said A.C. motor means when a different set of selected switches from said four sets of oppositely disposed diode-like switches is energized.

* * * * *